United States Patent [19]
Nagano

[11] Patent Number: 4,613,319
[45] Date of Patent: Sep. 23, 1986

[54] SPEED CHANGE DEVICE FOR A BICYCLE

[75] Inventor: Masashi Nagano, Izumi, Japan

[73] Assignee: Shimano Industrial Company Limited, Osaka, Japan

[21] Appl. No.: 637,729

[22] Filed: Aug. 6, 1984

[30] Foreign Application Priority Data

Aug. 8, 1983 [JP] Japan .................... 58-123660[U]

[51] Int. Cl.⁴ .................... F16H 7/18; B60K 20/00; G05G 5/06
[52] U.S. Cl. .................... 474/80; 74/475; 74/527
[58] Field of Search ............... 474/80, 81, 82; 74/475, 74/527

[56] References Cited

U.S. PATENT DOCUMENTS

| | | | |
|---|---|---|---|
| 4,223,562 | 9/1980 | Nagano | 474/82 |
| 4,232,564 | 11/1980 | Yamasaki | 74/475 |
| 4,279,605 | 7/1981 | Egami | 474/82 |
| 4,454,784 | 6/1984 | Shimano | 74/475 |
| 4,470,823 | 9/1984 | Shimano | 74/475 X |
| 4,486,182 | 12/1984 | Couë | 474/80 |

FOREIGN PATENT DOCUMENTS 3411874 10/1984 Fed. Rep. of Germany .
802846 9/1936 France .

Primary Examiner—John M. Jillions
Attorney, Agent, or Firm—Stevens, Davis, Miller & Mosher

[57] ABSTRACT

A speed change device for a bicycle includes a speed change lever and a front derailleur with a chain guide supported movably in reciprocation and axially of a plurality of front chain gears. The chain guide includes an inner plate having an inwardly enlarged portion enlarge toward a low speed front chain gear with respect to a high speed front chain gear. The inwardly enlarged portion is located in a range of movement of the driving chain in which the chain engages with a high speed front chain gear. The chain guide includes an outer plate having an outwardly enlarged portion enlarged toward the high speed front gear with respect to the low speed one. The outwardly enlarged portion is located within a range of movement of the chain in which the chain engages with the low speed front chain gear. The speed change lever includes a lever body and a fixing member for rotatably supporting the lever body. A positioning mechanism and a sound generating mechanism are provided between the lever body and the fixing member.

1 Claim, 6 Drawing Figures

4,613,319

SPEED CHANGE DEVICE FOR A BICYCLE

FIELD OF THE INVENTION

This invention relates to a speed change device for a bicycle, and more particularly to a speed change device comprising a speed change lever and a front derailleur so that the speed change lever is operated to move a chain guide at a front derailleur in reciprocation axially of multistage front chain gears to thereby switch a driving chain by the chain guide to a desired one of the multistage front chain gears.

BACKGROUND OF THE INVENTION

Figure 6:
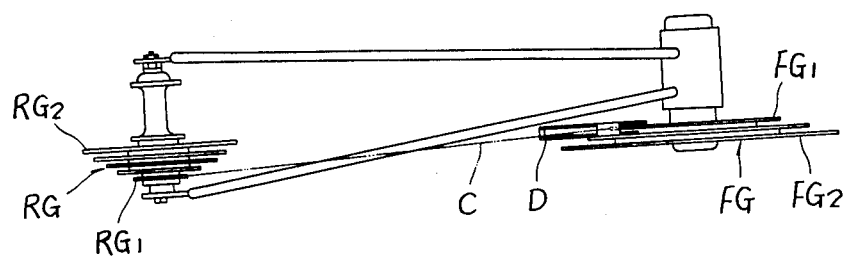

Generally, bicycle speed change device are well-known, in which, as shown in FIG. 6, a front derailleur D and a rear derailleur ( not shown ) are operated by speed change levers to thereby move chain guides axially of the chain gears and switch a driving chain to desired ones of front chain gears FG and that of rear chain gears RG. The chain line of the driving chain may skew between the front chain gear FG and the rear chain gear RG, especially largely between a low speed front chain gear $FG_1$ and a high speed rear chain gear $RG_1$ or between a high speed front chain gear $FG_2$ and a low speed rear chain gear $RG_2$. In this case, the chain may strike the chain guide at its outer or inner plate to thereby generate noises. This often occurs when three front chain gears or six front chain gears are used.

In order to prevent such noise generation, a cyclist conventionally adjusts the speed change lever in position when operated to interrupt the continuation of noises.

Such conventional method is troublesome for the cyclist because the lever should be adjusted each time noises are generated. Also, it is impossible for the front derailleur to set its chain guide in position by operating the speed change lever for the front derailluer. The reason for the above is that even when a positioning mechanism for the front derailleur is provided at the speed change lever for the front derailleur, the aforesaid problem of noise generation has not been solved.

SUMMARY OF THE INVENTION

This invention is directed to elimination of noises in the conventional speed change device caused by contact of the chain guide at the front derailleur with the chain to mesh with the front chain gear. This invention is also directed to provision of a positioning mechanism at the speed change gear for the front derailleur, for positioning the chain guide thereof with respect to each front chain gear, so that even an unskilled cyclist can easily accomplish proper speed change operation.

An object of the invention is to provide a speed change device having swollen or enlarged portions provided at the outer and inner plates of the chain guide at the front derailleur to avoid contact of both the plates with the chain, thereby eliminating the noise generation, and also having a positioning mechanism provided at the speed change lever for the front derailleur to thereby enable the chain guide to be set in position.

In detail, this invention is an improvement in the type of speed change device comprising a speed change lever, a front derailleur, and a chain guide which has inner and outer plates and which is supported to be movable in reciprocation and axially of the front chain gears. An inward swollen portion swollen toward the low speed front chain gear with respect to the high speed one is provided at the inner plate of the chain guide and in a range of movement of the chain to be in engagement with the high speed front gear, and an outward swollen portion swollen toward the high speed front gear is provided at the outer plate of the same and in a range of movement of the chain to mesh with the low speed front chain gear. Also, in the speed change lever comprising a lever body and a fixing member for rotatably supporting the lever body is provided a positioning mechanism for positioning the chain guide. Hence, the inward and outward swollen portions avoid contact of the chain with the inner and outer plates and the chain guide is stopped always in position.

In other words, a novel construction of the invention is to provide the inward swollen portion at the inner plate at the chain guide to provide the outer swollen portion at the outer plate of the chain and guide to provide positioning mechanism between the lever body and the fixing member at the speed change lever. Hence, the positioning mechanism ensures operation of speed change lever to set the chain gear in position to thereby enable the even unskilled cyclists to perform accurate speed change. Furthermore, the noise generation by interference of the chain with the inner or outer plate is eliminated, thereby providing a speed change device for the bicycle reliable and easy to operate for changing the bicycle speed.

The above and further objects and novel features of the invention will more fully appear from the following detailed description when the same is read in connection with the accompanying drawings.

BRIEF DESCRIPTION OF THE INVENTION

Figure 1:
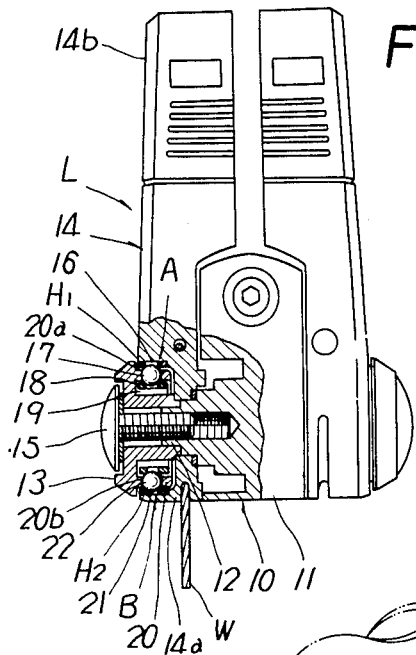
Figure 2:
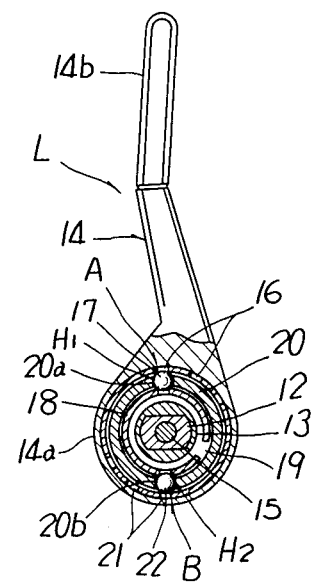
Figure 3:
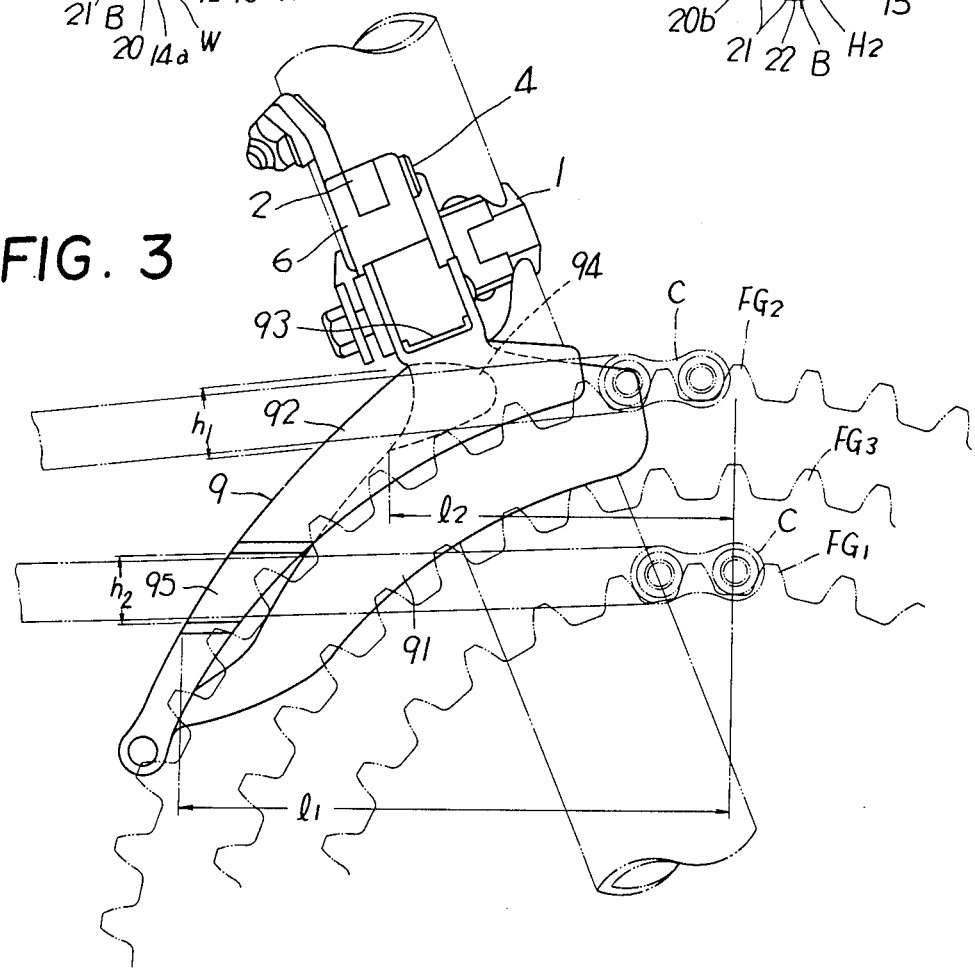
Figure 4:
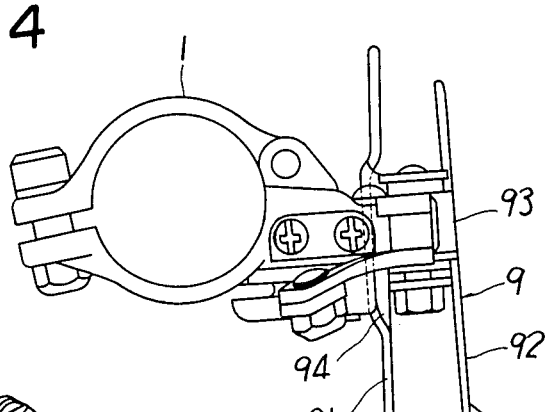
Figure 5:
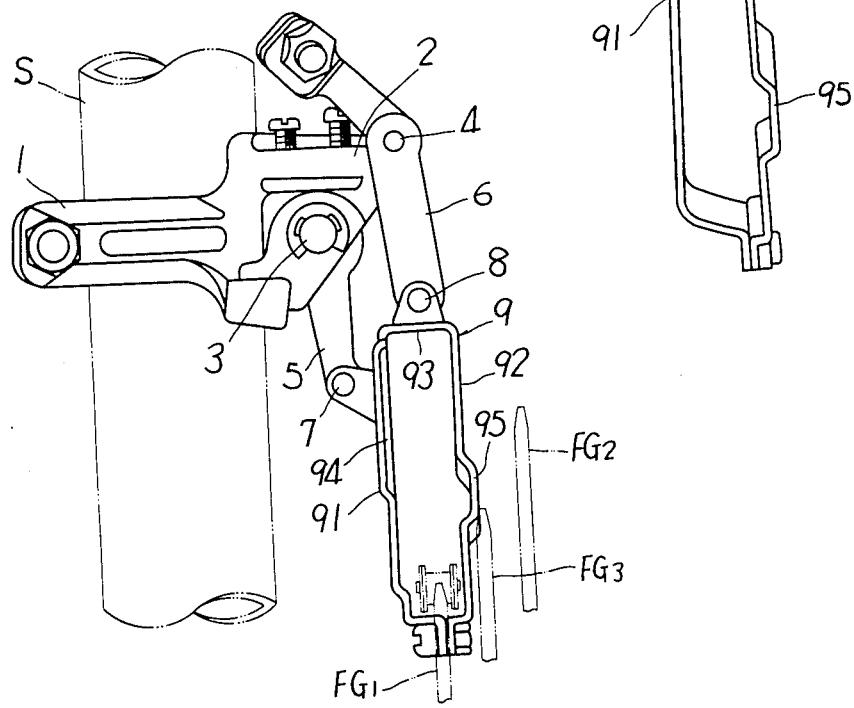

FIG. 1 is a partially cutaway front view of an embodiment of a speed change lever at a speed change device of the invention, FIG. 2 is a sectional view taken on the line II—II in FIG. 1, FIG. 3 is a front view of a front derailleur in the FIG. 1 embodiment, FIG. 4 is a plan view of the front derailleur in FIG. 3, FIG. 5 is a side view thereof, and FIG. 6 is an illustration of the relation between the front chain gear, front derailleur and chain gear.

DETAILED DESCRIPITON OF THE INVENTION

The speed change device of the invention comprises a speed change lever L and a front derailleur D. At first, explanation will be given on the front derailleur D in accordance with FIGS. 3 and 5.

The front derailleur shown is well-known in basic construction. A fixing member 2 is fixed to the seat tube S of the bicycle frame through a tightening band 1, and a pair of linkage members 5 and 6 are pivoted to the fixing member 2 through two pins 3 and 4. A chain guide 9 for guiding the driving chain C to one front chain gear FG is supported to the fore ends of linkage members 5 and 6 swingably through two pivot pins 7 and 8, and a return spring ( not shown ) is interposed between the chain guide 9 and the linkage member 6 to thereby bias the chain guide 9 toward the low speed front chain gear FG. A control wire ( not shown ) fixed to the linkage member 6 through a fixture ( not shown ) is pulled to swing the linkage members 5 and 6 to undergo forward movement axially of the front chain gears FG and toward the high speed front chain gear $FG_2$, and the wire is loosened to return the chain guide 9 toward the low speed chain gear $FG_1$ by means of a restoring force of the return spring.

The chain guide 9 comprises a pair of plates including inner plate 91 and outer plate 92, opposite to each other and spaced at an interval larger than a width of chain C, and a connecting plate 93 for connecting the plates 91 and 92. When the chain C is switched to the high speed front chain gear $FG_2$, the inner plate 91 contacts at the inside surface thereof with one side of chain C in engagement with the low speed front chain gear $FG_1$ and the chain is urged to the high speed front chain gear $FG_2$ to thereby disengage from the low speed front chain gear $FG_1$. On the contrary, the chain C, when switched to the low speed front chain gear $FG_1$, contacts at the other side with the inside surface of outer plate 92 and is urged toward the low speed front chain gear $FG_1$ to thereby disengage from the high speed front chain gear $FG_2$. In addition, the inner plate 91 and outer plate 92 each are formed in a circular arc along the outer edge of front chain gear FG.

At the inner plate 91 and in a range $h_1$ of movement of chain C in engagement with the high speed front gear $FG_2$, an inward swollen or enlarged portion 94 swollen toward the low speed front chain gear $FG_1$ with respect to the high speed front chain gear $FG_2$ is provided, thereby preventing the chain C in engagement with gear $FG_1$ from contacting with the inner plate 91. At the outer plate 92 and in a range $h_2$ of movement of chain C in engagement with the low speed front chain gear $FG_1$, an outward swollen portion 95 swollen toward the high speed front chain gear $FG_2$ with respect to the gear $FG_1$ is provided, thereby preventing the chain C in engagement with the gear $FG_2$ from contacting with the outer plate 92.

The inward swollen portion 94 is formed in width and depth to the extent that the chain carried by the high speed front chain gear $FG_2$ and low speed rear change gear $RG_2$ does not contact with the inner plate 91. The outward swollen portion 95 is formed in width and depth to the extent that the chain C carried by the low speed front chain gear $FG_1$ and high speed rear chain gear $RG_1$ does not contact with the outer plate 92.

In a case where the chain C engages with the low speed front chain gear $FG_1$, a length $l_1$ between the chain entering side end at the outer plate 92 and the engaging point of chain C with the low speed front chain gear $FG_1$ is larger than length $l_2$ between the chain entering side end at the inner plate 91 and the engaging point of chain C with the high speed front chain gear $FG_2$ when the chain engages therewith. Hence, the outward swollen portion 95 is formed throughout the width of outer plate 92 so as to be enlarged. On the other hand, the inward swollen portion 94 is skewed at the chain entering portion at the inner plate 91 not to be so largely swollen.

Next, explanation will be given on a speed change lever L constituting the speed change device of the invention.

Referring to FIGS. 1 and 2, the speed change lever L is so constructed that a fixing member 10 comprises a fixture 11 mounted to the bicycle frame, such as the down tube, through a tightening band. A lever shaft 12 projects from one side of fixture 11, and a cap 13 fits not-rotatably onto the outermost end of lever shaft 12 through a through bore. A lever body 14 having at one end a boss 14a and at the other end a grip 14b is supported at the boss 14a onto the lever shaft 12; the cap 13 is disposed outside the boss 14a. A tightening screw 15 posses through cap 13 and screws with a central threaded bore at the lever shaft 12, thereby holding the lever body 14. A retainer at one end of a control wire W is supported in the vicinity of boss 14a.

Between the boss 14a and the cap 13 is provided a positioning mechanism A for positioning the chain guide 9.

The positioning mechanism A comprises a plurality of engaging portions 16 comprising, for example through bores, a retainer 17, such as a roller, engageable selectively with one engaging portion 16, and an elastic member 18, such as an about C-like-shaped leaf spring, for biasing the retainer 17 toward each engaging portion 16. A cavity 19 is provided at the outside surface of boss 14a, the engaging portions 16 being formed at the inner periphery of cavity 19. Retainer 17 and elastic member 18 are housed within the cavity 19. The retainer 17 is supported elastically through the elastic member 18 into a holding bore 20a provided at a cylindrical holder 20 integral with the cap 13 and disposed in the cavity 19. Retainer 17 engages with one engaging portion 16 to determine the speed change stage and allows the lever 14 to stop in position corresponding to a desired speed change stage. In addition, the positioning mechanism is not defined in construction, but need only set the lever body 14 in its operating position and, in turn the chain guide 9 in position.

Next, explanation will be given on operations of speed change lever L and front derailleur D.

In a case where the chain C engaging with the low speed front chain gear $FG_1$ is switched to the middle speed front chain gear $FG_3$ or high speed gear $FG_2$, the lever body 14 is turned counterclockwise in FIG. 2 to an extent of a stroke preset by the positioning mechanism A so that the chain guide 9 is forwardy moved to an extent of movement set by the positioning mechanism A through the control wire W. Hence, the inside surface of inner plate 91 contacts with one side of chain C to thereby urge the chain C toward the high speed front chain gear $FG_2$.

Since the inward swollen portion 94 is not provided at the inside surface in a range of urging the chain C towards the high speed front chain gear $FG_2$, the chain C can be switched thereto as the same as in the conventional devices. In a case where the chain C has been switched to the high speed front chain gear $FG_2$, since the inward swollen portion 94 is provided in a range $h_1$ of movement of chain C to be switched to the high speed front chain gear $FG_2$, the chain C, even when largely skewed with its chain line extending between the high speed front chain gear $FG_2$ and the low speed rear chain gear $RG_2$, can be reliably prevented from contact with the inner plate 91.

In a case where the chain C having been switched to the middle speed front chain gear $FG_3$ or high speed front chain gear $FG_2$ is switched again to the low speed front chain gear $FG_1$, the lever body 14 is moved backwardly by the preset stroke, and the chain guide 9 moves backwardly by an amount of movement set by the positioning mechanism A. The chain guide 9 moves backwardly to bring the inside surface of the outer plate 92 into contact with one side of chain C and the chain C is urged toward the low speed front gear $FG_1$. In this case, since the outward swollen portion 95 is not provided at the inside surface of outer plate 92 and in a range where the chain C is urged toward the low speed front chain gear $FG_1$, the chain can be switched thereto the same as in the conventional devices. On the other hand, the outward swollen portion 95 is provided at the outer plate 92 and in a range of moving the chain C to be switched to the low speed front chain gear $FG_1$, whereby the chain C, even when its chain line largely skews between the low speed front chain gear $FG_1$ and the high speed rear chain gear $RG_1$, can be prevented from contact with the outer plate 92.

In addition, the speed change lever L in FIGS. 1 and 2 is provided with a sound generating mechanism B separate from the positioning mechanism A and corresponding to the set position by the positioning mechanism A.

The sound generating mechanism B comprises a plurality of engaging portions 21 of through bores, a sound generator 22, such as a ball, engageable with one engaging portion 21, and a spring 18 to bias the sound generator 22 toward one engaging portion 21. The engaging portions 21 are provided at the inner periphery of the cavity 19 and the sound generator 22 is housed therein, so that the sound generator 22 is supported elastically into a bore 20b at the holder 20 through the spring 18 to thereby engage the sound generator 22 with one engaging portion 21.

The positioning mechanism A includes a relatively small a gap $H_1$ between the retainer 17 and the inner surface of holding bore 20a so that play therebetween is eliminated. The sound generating mechanism B has a relatively large gap $H_2$ between the inner surface of bore 20b and the sound generator 22, to enable large vibrations of sound generator 22 to generate a clear and loud sound.

In such construction, when the lever body 14 is operated forwardly, the retainer 17 in engagement with one engaging portion 16 at the positioning mechanism A and the sound generator 22 in engagement with one engaging portion 21 at the sound generating mechanism B, retract and move against the spring 18 and ride across about simultaneously the crests disposed between the respective engaging portions now in engagement with the retainer 17 and sound generator 22 and the adjacent portions to engage next therewith respectively through a spring force of elastic member 18, whereby the sound generator 22 vibrates largely in the bore 20b to generate a loud and clear sound. On the other hand, the retainer 17 is restricted by the narrow gap $H_1$, to thereby stop at the set position without play.

The front derailleur shown has the inner plate 91 and outer plate 92 vertically spaced from each other, the inner plate 91 extending along the outer periphery of the middle speed front chain gear $FG_3$, the outer plate 92 extending along that of high speed front chain gear $FG_2$. Such construction can reduce a length between the chain urging portion at the chain guide 9 and the teeth in engagement with the chain C, thereby improving the switching capability of chain C to the high speed front chain gear $FG_2$.

Alternatively, the speed change device of the invention may be available to the derailleur of two chain gears or four or more front chain gears.

As seen from the above, the speed change device of the invention can always stop the chain guide in position by use of the positioning mechanism and can prevent noise generation by use of the outer swollen portion and the inner swollen portion as described above, so that the desired speed change stage is ensured without particular operation, thereby improving the speed change efficiency.

While an embodiment of the invention has been shown and described, the invention is not limited to the specific construction thereof, which is merely exemplary in the specification rather than defined or limited.

What is claimed is:

1. A speed change device for a bicycle, comprising a front derailleur having a speed change lever for switching a driving chain from one to another of a plurality of multistage front chain gears comprising at least one low speed front chain gear and at least one high speed front chain gear, said front derailleur including a chain guide which is supported movably in reciprocation axially of said front chain gears, said chain guide having an inner plate and an outer plate, said inner plate including an inwardly enlarged portion enlarged toward said low speed front chain gear and away from said high speed front chain gear, said inwardly enlarged portion being located at an upper portion of the inner plate within a range of movement of said chain in which said chain engages with said high speed front chain gear, said outer plate having an outwardly enlarged portion enlarged toward said high speed front chain gear and away from said low speed front chain gear, said outwardly enlarged portion being located at a lower portion of the outer plate within a range of movement of said chain in which said chain engages with said low speed front chain gear.

* * * * *